(12) United States Patent
Brockner et al.

(10) Patent No.: US 12,729,779 B2
(45) Date of Patent: Sep. 8, 2026

(54) CAM DRIVEN FLUID VALVE ASSEMBLY

(71) Applicant: Robert Bosch GmbH, Stuttgart (DE)

(72) Inventors: Hank Brockner, Grosse Isle, MI (US); Chris Franklin, Canton, MI (US); Stephen Zukowski, Howell, MI (US); Paul Mason, Dearborn, MI (US); David Toutant, Grosse Pointe Woods, MI (US); Thomas R Chapman, Templeton, MA (US); George Popovici, Woburn, MA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/754,642

(22) Filed: Jun. 26, 2024

(65) Prior Publication Data

US 2025/0020236 A1 Jan. 16, 2025

Related U.S. Application Data

(60) Provisional application No. 63/526,839, filed on Jul. 14, 2023.

(51) Int. Cl.

| | |
|---|---|
| ***F16K 31/524*** | (2006.01) |
| ***F16K 3/18*** | (2006.01) |
| ***F16K 27/04*** | (2006.01) |
| *F01P 7/14* | (2006.01) |

(52) U.S. Cl.

CPC ........ *F16K 31/52475* (2013.01); *F16K 3/184* (2013.01); *F16K 27/044* (2013.01); *F16K 31/52483* (2013.01); *F01P 2007/146* (2013.01)

(58) Field of Classification Search

CPC .. F16K 31/52475; F16K 3/184; F16K 27/044; F16K 31/52483; F16K 31/52; F16K 31/5286; F01P 2007/146

USPC .................................................. 251/326–329

See application file for complete search history.

(56) References Cited

U.S. PATENT DOCUMENTS

| | | | | |
|---|---|---|---|---|
| 1,567,537 | A * | 12/1925 | Mockus | F16K 31/523 137/625.33 |
| 2,925,994 | A * | 2/1960 | Downs | F16K 27/044 251/360 |
| 2,993,488 | A * | 7/1961 | Stec | F01L 5/02 137/625.33 |
| 3,121,553 | A * | 2/1964 | Grove | F16K 3/0227 251/327 |
| 3,215,157 | A * | 11/1965 | Anderson | F16K 3/36 251/327 |

(Continued)

FOREIGN PATENT DOCUMENTS

| | | |
|---|---|---|
| DE | 102014204120 | 9/2015 |
| ES | 1237579 | 11/2019 |
| WO | 2023025548 | 3/2023 |

*Primary Examiner* — John Bastianelli

(74) *Attorney, Agent, or Firm* — David Kovacek

(57) ABSTRACT

A cam-driven valve system includes a valve housing configured to define a plurality of fluid passageways and to support an array of sliding gate fluid valves in the fluid passageways in such a way that the flow of fluid therethrough is controlled. The system includes a plurality of cams supported on a cam shaft. The cam shaft is arranged so that each cam is associated with a corresponding sliding gate valve. Rotation of the cam shaft results in actuation of the valves via the cams. The cams of the cam shaft vary in shape and size.

20 Claims, 10 Drawing Sheets

(56) References Cited

U.S. PATENT DOCUMENTS

| | | | | |
|---|---|---|---|---|
| 3,333,816 | A * | 8/1967 | Williams | F16K 3/0227 251/327 |
| 4,257,447 | A * | 3/1981 | Clarkson | F16K 3/316 251/327 |
| 4,881,719 | A * | 11/1989 | Bowman | F16K 3/0263 251/328 |
| 5,014,730 | A * | 5/1991 | Fye | F16K 3/0227 137/454.2 |
| 5,230,367 | A * | 7/1993 | Minch | F16L 55/02718 137/625.33 |
| 8,220,778 | B2 * | 7/2012 | Langmesser | F16K 3/20 251/328 |
| 10,788,143 | B2 | 9/2020 | Biester et al. | |
| 2006/0060811 | A1 * | 3/2006 | Kuwata | F16K 99/0011 251/327 |
| 2016/0017808 | A1 | 1/2016 | Chabaille et al. | |
| 2017/0191581 | A1 | 7/2017 | Brezowsky et al. | |
| 2021/0348689 | A1 * | 11/2021 | Mann, III | F16K 3/0254 |
| 2024/0240730 | A1 * | 7/2024 | Schmitt | F16K 31/52475 |

* cited by examiner 1
2
2
4
5
5
5
6
6
10
20
24
40
40
40
50
54
70
70
70
202
202
202
202

120
100
102

CAM DRIVEN FLUID VALVE ASSEMBLY

BACKGROUND

In an electric vehicle, a thermal management system can be used to provide heating and/or cooling to control the temperature of various vehicle components, systems and/or compartments. The thermal management of an electric vehicle may be complex. For example, to provide cooling, the thermal management system includes a coolant control system that directs coolant via one or more fluid pumps to and from the vehicle components, systems and/or compartments via a complex system of fluid pipes and fluid valves. To provide heating, the thermal management system includes a refrigerant control system that directs refrigerant through components that provide a refrigeration cycle. In some vehicles, multiport fluid valves may be used to control the flow of fluid through the thermal management system. However, when the thermal management system is sufficiently complex, multiport fluid valves become large in size to accommodate three, eight, twelve, sixteen or more ports as required by the system. In some cases, the size of the fluid valves becomes so large that it may become difficult to meet the packaging requirements of the thermal management system within the vehicle.

SUMMARY

The vehicle thermal management system includes a coolant control system having a cam-driven fluid valve assembly that can be used by the system to direct coolant, for example, to cool a drive motor, a charge air heat exchanger, a battery, power electronics modules, the vehicle passenger cabin and/or other vehicle components or systems that require temperature control.

For purposes of operational and packaging efficiency, it may be useful to combine multiple components of the vehicle thermal management system into a single, integrated module. Such a module may include the coolant control system, the refrigerant control system or both. The coolant control system may include, for example, one or more circulation pumps, a fluid reservoir, one or more fluid valves, a coolant control system controller, sensors, heat exchangers, etc. A housing of the module may include internal passageways that permit fluid communication between the various components of the system included in the module. Portions of the module housing may be configured to replace housing elements of certain components. For example, a portion of the module housing may be used to provide a lid of a fluid valve and/or fluid valve assembly, whereby the fluid valve assembly is connected to the module housing. For other components, the module may be configured to permit the component to "plug into" an appropriately configured portion of the module housing.

In the illustrated embodiment, the cam-driven fluid valve assembly includes a valve housing that may be integrated in the module housing (e.g., at least a portion of the valve housing may be common to the module housing). The valve housing of the cam-driven fluid valve assembly is configured to define a plurality of fluid passageways and to support an array of sliding gate valves in the fluid passageways in such a way that the flow of fluid through the valve housing is controlled. The assembly includes a plurality of lobed cams supported on a cam shaft. The cam shaft may be driven to rotate by an actuator. The cams rotate in concert with the cam shaft and each cam is arranged to control the open/closed state of a corresponding gate valve. Rotation of the cam shaft results in actuation of the valves via the cams and the cams may vary in shape, size and/or contact surface angle to allow for individual valve actuation times and durations. In some embodiments, the cam shaft and cams are arranged to open and close the fluid valves of the assembly in such a way that multiple fluid valves may allow direction of fluid to a single location and/or a single fluid valve may direct fluid to multiple locations depending on the vehicle operating conditions.

The cam-driven fluid valve assembly receives fluid actuated by one or more fluid pumps that may be integrated into the integrated module. The fluid pressures generated by the fluid pumps are sufficiently low that many components of the cam-driven fluid valve assembly including the stationary and/or sliding gates of the gate valves, may be formed of plastic or may be plastic that is reinforced with metal at strategic location, which reduces the cost and weight of the module and improves durability.

In some embodiments, a valve assembly includes an assembly housing having ports. Each port is configured to permit fluid communication between an environment of the assembly housing and an interior space of the assembly housing. The valve assembly includes a cam shaft supported on the assembly housing. The cam shaft is configured to rotate about a rotational axis. The cam shaft includes a cam that is supported on the cam shaft and rotates in concert with the cam shaft. In addition, the valve assembly includes a sliding gate valve having a first stationary plate, a movable plate and a second stationary plate. The first stationary plate has a first plate through-opening. The first stationary plate is disposed in the assembly housing and is fixed relative to the assembly housing so as to face a first one of the ports. The second stationary plate has a second plate through-opening. The second stationary plate is parallel to the first stationary plate. The second stationary plate is disposed in the assembly housing and is fixed relative to the assembly housing so as to face a second one of the ports and such that the second plate through opening is aligned with the first plate through-opening. The movable plate has a movable plate through-opening. The movable plate is disposed in the assembly housing between the first stationary plate and the second stationary plate. The movable plate is moveable relative to the first stationary plate within a plane that is parallel to the first stationary plate. The rotational axis is disposed in the plane, and the movable plate is configured to be driven by the cam to move within the plane.

In some embodiments, the movable plate is configured to be driven by the cam to reciprocate along a radius of the cam shaft.

In some embodiments, the movable plate is movable between a first position and a second position. In the first position, the movable plate through-opening is aligned with the first plate through-opening and the second plate through-opening, permitting fluid flow through the valve. In the second position, no alignment exists between the movable plate through-opening, the first plate through-opening and the second plate through-opening whereby fluid flow through the valve is prevented.

In some embodiments, the movable plate is biased to the second position by an elastic member that is coplanar with the plane.

In some embodiments, the amount of fluid flow through the valve is made variable by selectively positioning the movable plate at a location between the first position and the second position.

In some embodiments, the valve assembly includes a push rod that is disposed between an inner end of the movable plate and a peripheral surface of the cam. In addition, the valve assembly includes an elastic member disposed between an outer end of the movable plate and an inner surface of the assembly housing. The movable plate and the push rod are biased toward the cam via a spring force of the elastic member. When the cam shaft rotates about the rotational axis, the cam drives the movable plate via the push rod to move within the plane.

In some embodiments, the valve assembly includes a first valve seal that is disposed between the first stationary plate and the assembly housing. The first valve seal surrounds the first one of the ports. In addition, the valve assembly includes a second valve seal that is disposed between the second stationary plate and the assembly housing. The second valve seal surrounds the second one of the ports.

In some embodiments, the valve assembly is configured so that, in certain positions of the movable plate, fluid is permitted to flow through the sliding gate valve in one of a first direction and a second direction. The second direction is opposite the first direction. The first direction and the second direction are perpendicular to the plane. The valve assembly includes a first valve seal and a second valve seal. The first valve seal provides a fluid tight seal between the first stationary plate and the assembly housing regardless of direction of fluid flow through the valve. The second valve seal provides a fluid tight seal between the second stationary plate and the assembly housing regardless of direction of fluid flow through the valve.

In some embodiments, the valve assembly is configured to provide bi-directional sealing of the sliding gate valve such that a fluid tight seal exists between the sliding gate valve and the assembly housing regardless of direction of fluid flow through the valve.

In some embodiments, the cam comprises a first cam and a second cam, and the sliding gate valve comprises a first sliding gate valve and a second sliding gate valve. The movable plate of the first sliding gate valve is configured to be actuated by the cam shaft via the first cam, and the movable plate of the second sliding gate valve is configured to be actuated by the cam shaft via the second cam.

In some embodiments, the movable plate of the first sliding gate valve and the movable plate of the second sliding gate valve are coplanar and on opposed sides of the rotational axis.

In some embodiments, the movable plate of the first sliding gate valve and the movable plate of the second sliding gate valve are coplanar and on a common side of the rotational axis.

In some embodiments, the movable plate of the first sliding gate valve and the movable plate of the second sliding gate valve are coplanar and offset relative to each other along the rotational axis.

In some embodiments, the movable plate of the first sliding gate valve is biased toward the first cam via a first elastic member and the movable plate of the second sliding gate valve is biased toward the second cam via a second elastic member.

In some aspects, a valve assembly includes an assembly housing having ports. Each port is configured to permit fluid communication between an environment of the assembly housing and an interior space of the assembly housing. The valve assembly includes a cam shaft supported on the assembly housing. The cam shaft is configured to rotate about a rotational axis. The cam shaft includes a cam that is supported on the cam shaft and rotates in concert with the cam shaft. In addition, the valve assembly includes a sliding gate valve. The sliding gate valve includes a first stationary plate and a movable plate. The first stationary plate has a first plate through-opening. The first stationary plate is disposed in the assembly housing and is fixed relative to the assembly housing so as to face a first one of the ports. The movable plate has a movable plate through-opening. The movable plate is disposed in the assembly housing in a stacked arrangement with respect to the first stationary plate. The movable plate is moveable relative to the first stationary plate within a plane that is parallel to the first stationary plate. The rotational axis is disposed in the plane, and the movable plate is configured to be driven by the cam to move within the plane.

In some embodiments, the valve assembly includes a second stationary plate having a second plate through-opening. The second stationary plate is parallel to the first stationary plate, is disposed in the assembly housing and is fixed relative to the assembly housing so as to face a second one of the ports and such that the second plate through opening is aligned with the first plate through-opening.

In some aspects, a valve assembly includes fluid valves disposed in an assembly housing. The assembly housing includes a first manifold that defines a plurality of first ports, a second manifold, the second manifold defining a plurality of second valve ports. Each second valve port is associated with a corresponding one of the first ports to form a port pair. The assembly housing includes a valve chamber disposed between the first manifold and the second manifold. The valve chamber is in fluid communication with an interior space of the first manifold via the first ports and is in fluid communication with an interior space of the second manifold via the second valve ports. Each fluid valve is disposed in the valve chamber and is configured to control fluid flow between the first valve port and the second valve port of a respective port pair.

In some embodiments, the first manifold includes a first manifold plate that defines the plurality of first valve ports, and the second manifold includes a second manifold plate that is parallel to and spaced apart from the first manifold plate. The second manifold plate defines the plurality of second valve ports.

In some embodiments, a first axis extends in a direction perpendicular to the first manifold plate and the second manifold plate. Each second valve port is aligned with a corresponding one of the first valve ports in a direction parallel to the first axis to form the respective port pairs. In addition, each fluid valve is disposed in the valve chamber in alignment with a respective one of the port pairs and controls fluid flow between the first valve port and the second valve port of the respective one of the port pairs.

In some embodiments, each of the fluid valves is a sliding gate valve.

In some embodiments, at least one of the fluid valves is a sliding gate valve.

In some embodiments, the valve chamber is partitioned into cells so that each fluid valve is separated from adjacent fluid valves by wall portions that surround each first valve port.

In some embodiments, each cell is shaped and dimensioned to receive and support a single fluid valve therein.

In some embodiments, the valve assembly includes a cam shaft. The cam shaft is supported for rotation by corresponding ones of the wall portions. The cam shaft includes cams, and each cam is configured to actuate one of the fluid valves.

In some embodiments, the first manifold includes a first manifold plate that defines the plurality of first ports and first partitions that protrude from the first manifold plate in a direction away from the second manifold. The partitions segregate the interior space of the first manifold into first fluid passageways in such a way that each first fluid passageway is separated from adjacent first fluid passageways.

In some embodiments, at least one of the first fluid passageways is in fluid communication with a single first port, and others of the first fluid passageways are in communication with multiple first ports.

In some embodiments, the second manifold includes a second manifold plate that defines the plurality of second valve ports and second partitions that protrude from the second manifold plate in a direction away from the first manifold. The second partitions segregate the interior space of the second manifold into second fluid passageways in such a way that each second fluid passageway is separated from adjacent second fluid passageways.

In some embodiments, at least one of the second fluid passageways is in fluid communication with a single second valve port, and others of the second fluid passageways are in communication with multiple second valve ports.

In some embodiments, the assembly housing includes a third passageway that connects a first fluid passageway to a second fluid passageway, wherein the third passageway bypasses the fluid valves.

In some embodiments, the valve assembly includes a cam shaft. The cam shaft is supported for rotation in the valve chamber. The cam shaft includes cams. Each cam is configured to actuate one of the fluid valves. The valve chamber is segregated into a first region in which first wall portions are configured to support the fluid valves and a second region in which second wall portions enclose the cam shaft and cams. In addition, the valve assembly includes a first manifold port in one of the second wall portions that permits fluid communication between the first manifold and the second region, and a second manifold port in another one of the second wall portions that communicates between the second manifold and the second region. The second region provides a third fluid passage that extends between the first manifold chamber and the second manifold chamber.

In some aspects, a cam-driven valve assembly includes fluid valves disposed in an assembly housing. The assembly housing includes a first manifold that defines a plurality of first ports and a second manifold that defines a plurality of second valve ports. Each second valve port is aligned with a corresponding one of the first ports in parallel with a first axis to form a port pair. The assembly housing includes a valve chamber that receives the fluid valves and is disposed between the first manifold and the second manifold. The valve chamber is in fluid communication with the first manifold via the first ports and is in fluid communication with the second manifold via the second valve ports. The valve assembly includes a cam shaft that extends into the valve chamber. The cam shaft is supported for rotation by the assembly housing. The cam shaft is configured to be driven by an actuator to rotate about a shaft rotational axis. In addition, the valve assembly includes cams supported on the cam shaft. The cams rotate in concert with the cam shaft. The cams are arranged on the cam shaft so that each cam is aligned with a unique one of the fluid valves. The cams are shaped and dimensioned to engage the corresponding fluid valve in certain rotational orientations of the cam shaft relative to the assembly housing. Each fluid valve is disposed in the valve chamber in alignment with a port pair such that for certain rotational orientations of the cam shaft relative to the assembly housing, at least one cam engages a corresponding one of the fluid valves in such a way that the one of the fluid valves is moved between a first position and a second position. In the first position, fluid is permitted to flow between the first port and the second valve port of the port pair. In the second position, fluid is prevented from flowing between the first port and the second valve port of the port pair.

In some embodiments, the cam shaft and cams are arranged to open and close the fluid valves in such a way that multiple ones of the fluid valves may allow direction of fluid to a single other fluid valve and a single one of the fluid valves may direct fluid to multiple other ones of the fluid valves, depending on operating conditions of the assembly.

In some embodiments, the first manifold includes a first manifold plate and each first port is defined in the first manifold plate, the second manifold includes a second manifold plate that is parallel to the first manifold plate, and each second valve port is defined in the second manifold plate.

In some embodiments, the first manifold plate includes a first plate inner side that faces toward the valve chamber and a first plate outer side that faces away from the valve chamber. The first manifold plate includes first plate outer side partitions that protrude from the first plate outer side and segregate the first ports into a plurality of first fluid passageways of which at least one first fluid passageway communicates with a plurality of first ports.

In some embodiments, the second manifold plate includes a second plate inner side that faces toward the valve chamber and a second plate outer side that faces away from the valve chamber/The second manifold plate includes second plate outer side partitions that protrude from the second plate outer side and segregate the second valve ports into a plurality of second fluid passageways of which at least one second fluid passageway communicates with a plurality of second valve ports.

In some embodiments, the valve assembly includes wall portions disposed in the valve chamber between the first manifold and the second manifold, the wall portions configured to support the fluid valves relative to the ports.

In some embodiments, the valve chamber is partitioned into cells by the wall portions, the wall portions configured so that each valve is separated from adjacent valves.

In some embodiments, wall portions surround each port pair.

In some embodiments, each cell is shaped and dimensioned to receive and support a single fluid valve therein.

In some embodiments, the valve assembly includes a cam shaft, wherein the cam shaft is supported for rotation by the wall portions. The cam shaft includes cams, each cam configured to actuate a corresponding one of the fluid valves.

In some embodiments, the cam shaft is disposed between a first array of port pairs and a second array of port pairs, the port pairs being disposed side-by-side within each array.

BRIEF DESCRIPTION OF THE FIGURES

In FIG. 6, the housing regions are illustrated using broken lines.

DETAILED DESCRIPTION

Figure 1:
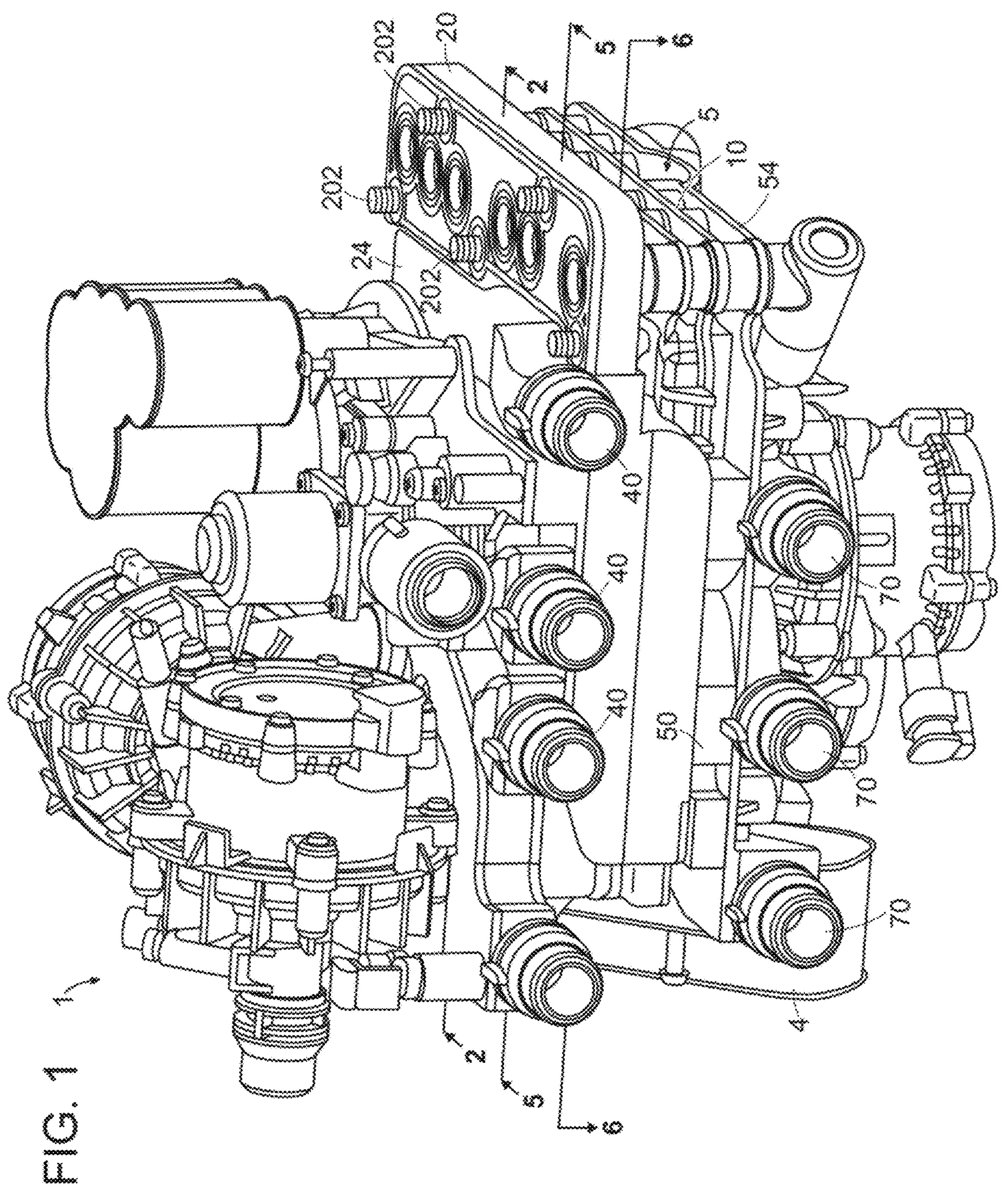
FIG. 1 is a perspective view of an integrated module of a thermal management system that includes a cam-driven fluid valve assembly.

Referring to FIG. 1, a cam-driven fluid valve assembly 5 can be used to control fluid flow in a fluid circuit such as may be found in a vehicle thermal management system, for example to control coolant flow through a coolant circuit. In some embodiments, the valve assembly 5 may be a stand-alone component that can be connected to fluid lines of the fluid circuit. In the illustrated embodiment, the valve assembly 5 is integrated into a module 1 that also includes other components of the vehicle thermal management system and integrates them into a single, integrated unit.

Figure 2:
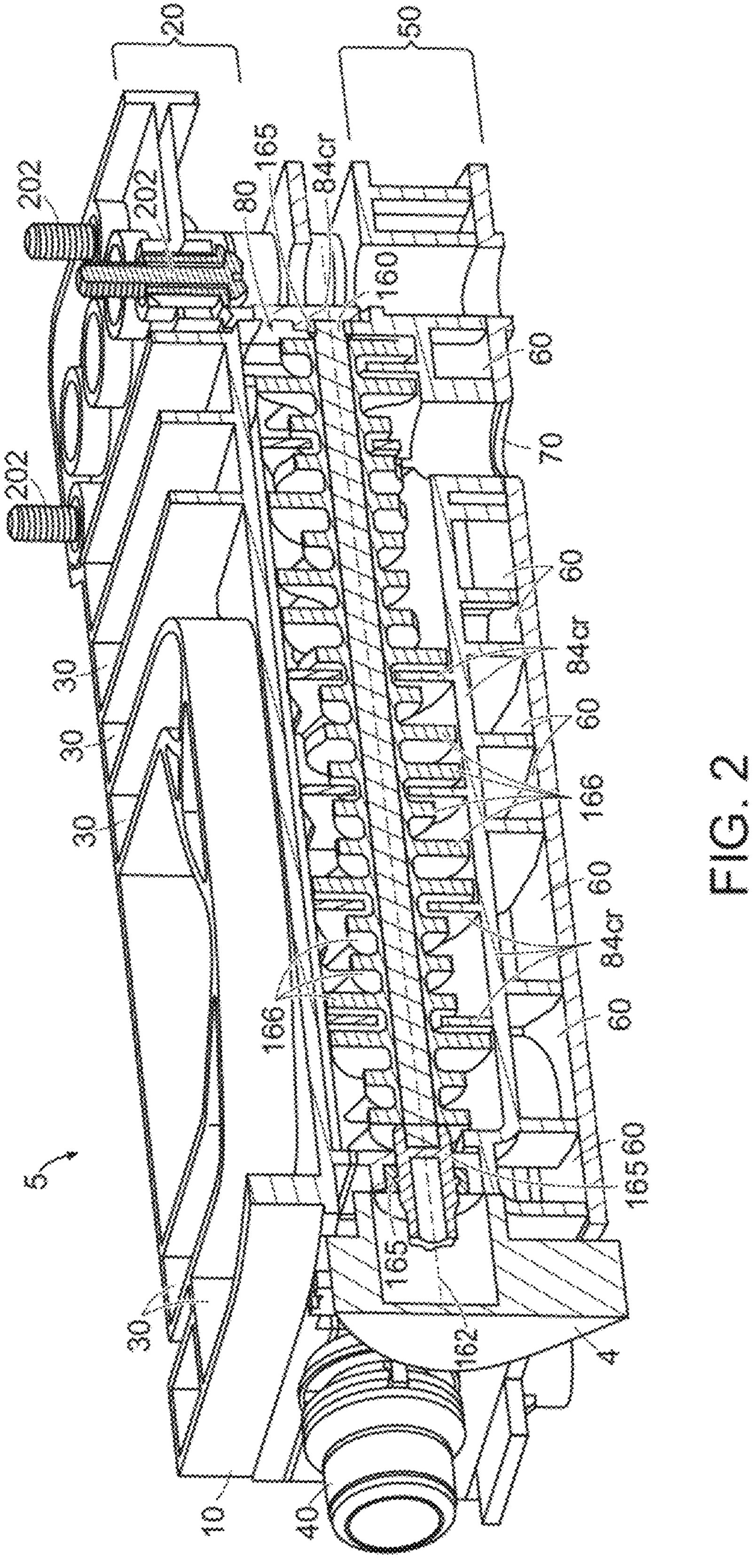
FIG. 2 is a cross-sectional view of the cam-driven fluid valve assembly as seen along line 2-2 of FIG. 1.
Figure 3:
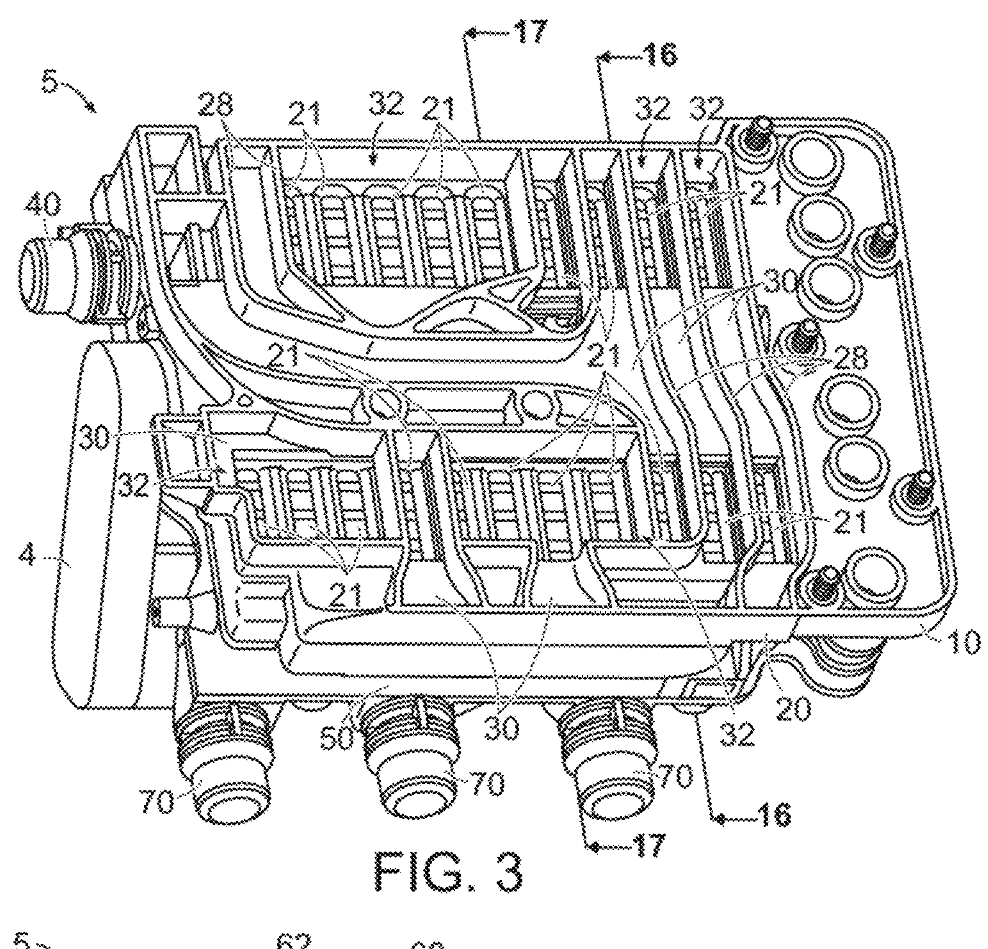
FIG. 3 is a top perspective view of the cam-driven fluid valve assembly that forms part of the integrated module, shown with the first manifold cover omitted to permit visualization of the fluid passageways in the first manifold.
Figure 4:
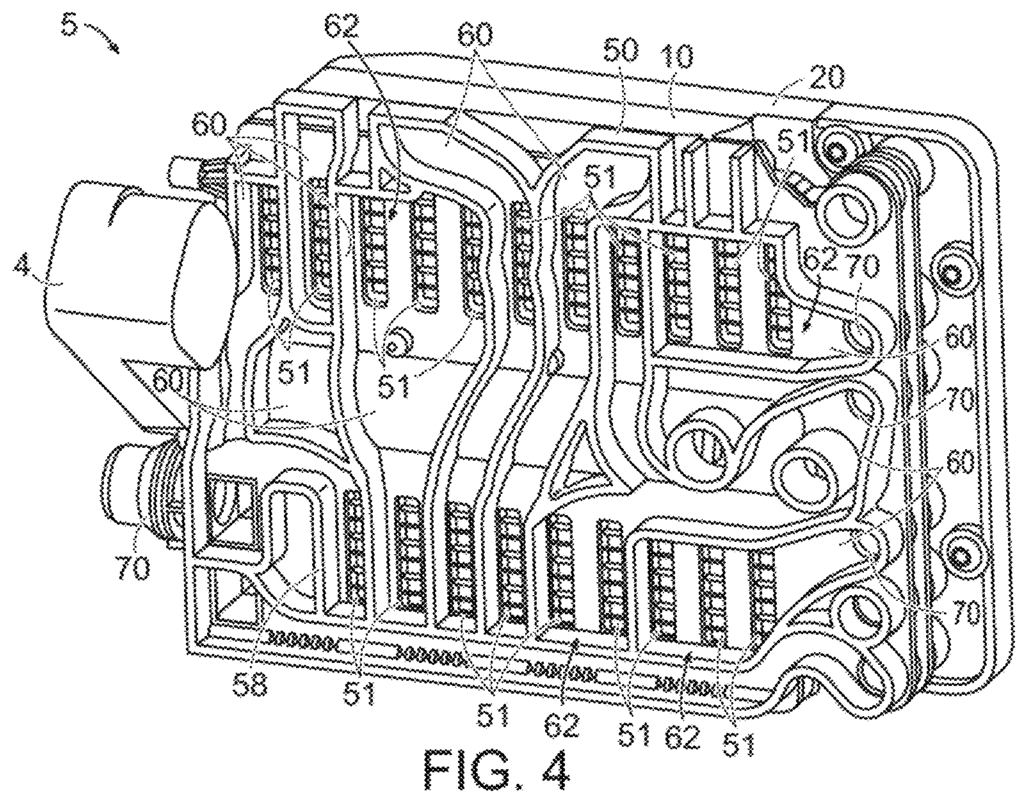
FIG. 4 is a bottom perspective view of the cam-driven fluid valve assembly that forms part of the integrated module, shown with the second manifold cover omitted to permit visualization of the fluid passageways in the second manifold.
Figure 5:
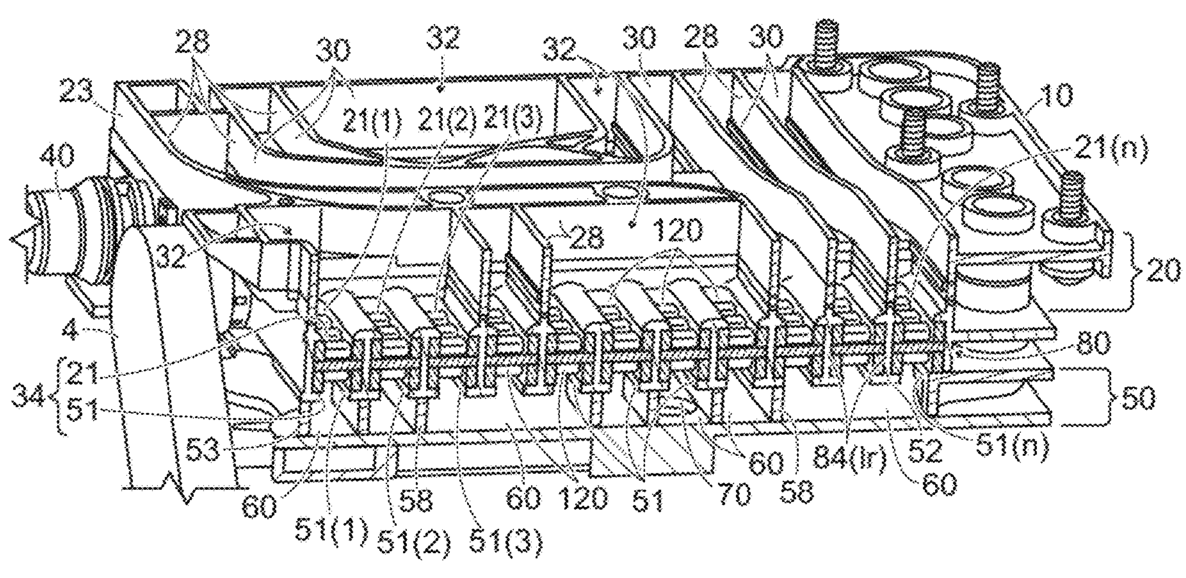
FIG. 5 is a cross-sectional view of the cam-driven fluid valve assembly as seen along line 5-5 of FIG. 1.

Referring to FIGS. 2-7, the valve assembly 5 includes an assembly housing 10. The assembly housing 10 is a multi-layer structure that includes a first manifold 20, a second manifold 50 and a valve chamber 80. The assembly housing 10 has a stacked or layered configuration in which the first manifold 20 overlies the second manifold 50 such that the valve chamber 80 is defined therebetween. References to direction used herein such as above, below, over, under, overlying, underlying, etc., are made with respect to the orientation of the valve assembly 5 as shown in FIGS. 1 and 2. The orientation of the valve assembly 5 is not limited to that shown in FIGS. 1 and 2, and the references to direction are relative only and are not intended to be limiting.

The first manifold 20 has first fluid passageways 30 that provide a fluid connection between first circuit ports 40 and first valve ports 21. The first circuit ports 40 provide a connection between the coolant circuit and the first fluid passageways 30 of the first manifold 20. The first valve ports 21 provide a connection between the first fluid passageways 30 and fluid valves 120 of the valve assembly 5.

Similarly, the second manifold 50 has second fluid passageways 60 that provide a fluid connection between second circuit ports 70 and second valve ports 51. The second circuit ports 70 provide a connection between the coolant circuit and the second fluid passageways 60 of the second manifold 50. The second valve ports 51 provide a connection between the second fluid passageways 60 and fluid valves 120 of the valve assembly 5. Each second valve port 51 is associated with a corresponding one of the first valve ports 21 to form a port pair 34.

The valve assembly housing 10 includes the valve chamber 80 that is disposed between the first manifold 20 and the second manifold 50. In addition, the valve assembly 5 includes fluid valves 120 and a cam shaft 160 that includes cams 166 that are configured to individually activate each fluid valve 120. The fluid valves 120 and cam shaft 160 are disposed in the valve chamber 80 and cooperate to control fluid flow between the first and second valve ports 21, 51 of each port pair 34.

In the illustrated embodiment, actuation of the cam shaft 160 permits each cam 166 to move a valve body of a corresponding fluid valve 120, whereby the timing, sequencing and pattern of fluid flow through the assembly housing 10, and also the coolant circuit, can be precisely controlled. In addition, the first and second manifolds 20, 50 of the valve assembly 5 each provide a large number of valve ports 21(1), 21(2), 21(3) . . . **21(*n*) and 51(1), 51(2), 51(3), . . . 51(*n*) in a compact package, accommodating a complex fluid circuit and allowing for multiple modes of fluid delivery. The variable n is an integer greater than zero. The value of n is determined by the requirements of the specific application. For example, in the illustrated embodiment, the number n of first valve ports 21, second valve ports 51 and valve port pairs 34 is 21. The cam-driven fluid valve assembly 5** will now be described in detail.

The first manifold 20 includes a first manifold plate 22 that adjoins and is surrounded by a first manifold housing 23. The first manifold housing 23 is closed at one end by the first manifold plate 22. An opposed end of the first manifold housing 23 may be closed by a first manifold cover 24 (shown in FIG. 1). In the illustrated embodiment, the first manifold cover 24 is an internal portion of the assembly housing 10 that is common with a portion of the module 1, and as such may include the first circuit ports 40 that permit fluid flow from the first fluid passageways 30 to other components of the module 1. The first manifold cover 24 overlies the first manifold plate 22, and an interior space of the first manifold 20 is defined between the first manifold plate 22, the first manifold cover 24 and the first manifold housing 23.

The first manifold plate 22 has a first plate inner side 25 that faces toward the second manifold 50 and is common with the valve chamber 80. In addition, the first manifold plate 22 has a first plate outer side 26 that faces away from the valve chamber 80 and the second manifold 50.

The first manifold plate 22 includes multiple first valve ports 21(1), 21(2), 21(3) . . . **21(*n*) which are through holes that extend from the first plate inner side 25 to the first plate outer side 26**.

The first manifold 20 includes first plate partitions 28 that extend between the first plate outer side 26 and the first manifold cover 24. The first plate partitions 28 segregate the first valve ports 21 into a plurality of first valve port groups 32. Each first valve port group 32 includes at least one first valve port 21. The first plate partitions 28 may be arranged so that some first valve port groups 32 include a plurality of first valve ports 21. The arrangement of the first valve port groups 32 is determined by the requirements of the specific application. In addition, at locations between the first valve ports 21 and the first manifold housing 23, the first plate partitions 28 may segregate the interior space of the first manifold 20 into the first fluid passageways 30 that connect, and permit fluid communication between, a first valve port group 32 and, for example, one or more of the first circuit ports 40 that provide a connection to fluid lines of the coolant circuit.

The second manifold 50 includes a second manifold plate 52 that adjoins and is surrounded by a second manifold housing 53. The second manifold housing 53 is closed at one end by the second manifold plate 52. An opposed end of the second manifold housing 53 may be closed by a second manifold cover 54. In the illustrated embodiment, the second manifold cover 54 is an external portion of the assembly housing 10 that is common with a portion of the module 1, and as such may include the second circuit ports 70 that permit fluid flow from the second fluid passageways to other components of the coolant system. The second manifold cover 54 underlies the second manifold plate 52, and an interior space of the second manifold 50 is defined between the second manifold plate 52, the second manifold cover 54 and the second manifold housing 53.

The second manifold plate 52 is parallel to or substantially parallel to the first manifold plate 22. As used here, the term "substantially" refers to within two degrees to four degrees from parallel and is used to account for variations that may normally occur during manufacturing and/or assembly. The second manifold plate 52 has a second plate inner side 55 that faces toward the first manifold 20 and is common with the valve chamber 80. In addition, the second manifold plate 52 has a second plate outer side 56 that faces away from the valve chamber 80 and the first manifold 20.

The second manifold plate 52 includes multiple second valve ports 51(1), 51(2), 51(3) . . . **51(*n*) which are through holes that extend from the second plate inner side 55 to the second plate outer side 56. The number of second valve ports 51 corresponds to the number of first valve ports 21, so in the illustrated embodiment, the number n of second valve ports 51 equals 21**.

Each second valve port 51 is aligned with a corresponding one of the first valve ports 21 in a direction parallel to a port pair axis 36 to form the respective port pairs 34, where the port pair axis 36 is perpendicular to each of the first manifold plate 22 and the second manifold plate 52. In other words, each second valve port 51(1), 51(2), 51(3) . . . **51(*n*) is paired with a corresponding one of the first valve ports 21(1), 21(2), 21(3) . . . 21(*n*) to form a respective port pair 34(1), 34(2), 34(3) . . . 34(*n*), where the valve ports 21, 51 that provide the port pair 34 are aligned in a direction parallel to the port pair axis 36**.

The second manifold 50 includes second plate partitions 58 that extend between the second plate outer side 56 and the second manifold cover 54. The second plate partitions 58 segregate the second valve ports 51 into a plurality of second valve port groups 62. Each second valve port group 62 includes at least one second valve port 51. The second plate partitions 58 may be arranged so that some second valve port groups 62 include a plurality of second valve ports 51. The arrangement of the second valve port groups 62 is determined by the requirements of the specific application. In addition, at locations between the second valve ports 51 and the second manifold housing 53, the second plate partitions 58 may segregate the interior space of the second manifold 50 into the second fluid passageways 60 that connect, and permit fluid communication between, a second valve port group 62 and, for example, one or more of the second circuit ports 70 that provide a connection to fluid lines of the coolant circuit.

Figure 6:
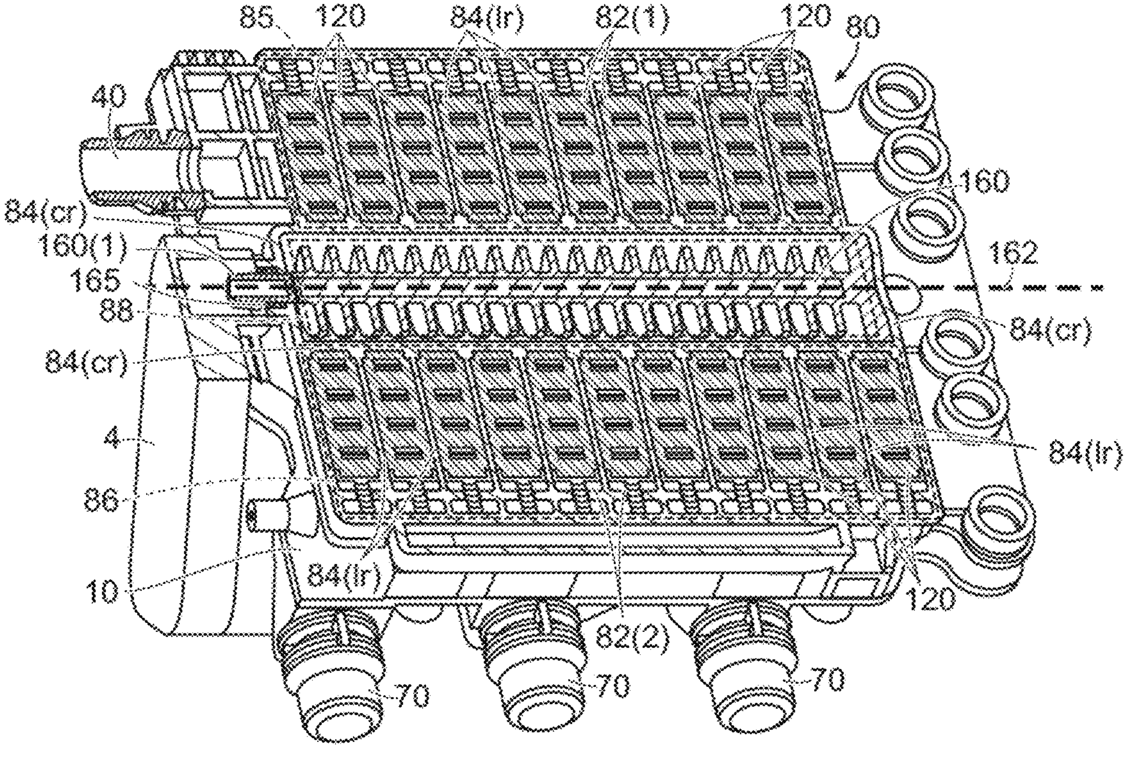
FIG. 6 is a cross-sectional view of the cam-driven fluid valve assembly as seen along line 6-6 of FIG. 1.

The valve chamber 80 is disposed between and adjoins the first manifold 20 and the second manifold 50. The valve chamber 80 is in fluid communication with the first manifold 20 via the first valve ports 21 and is in fluid communication with the second manifold 50 via the second valve ports 51. The valve chamber 80 includes wall portions 84 that extend between the first plate inner side 25 and the second plate inner side 55. The wall portions 84 segregate the valve chamber 80 into three regions 85, 86, 88 that are arranged side-by-side (FIG. 6). Specifically, the wall portions 84 define a central region 88 that is configured to rotatably support the cam shaft 160, a first lateral region 85 disposed on one side of the central region 88 and a second lateral region 86 disposed on a side of the central region 88 that is opposite the first lateral region 85. The first and second lateral regions 85, 86 serve as fluid valve banks and are each configured to support an array of fluid valves 120.

The wall portions **84(*lr*) in each of the first and second lateral regions 85, 86, surround the first valve port 21 and the second valve port 51 of each port pair 34 and segregate the valve chamber 80 into cells 82 in such a way that each cell 82 is separated from adjacent cells 82. Each cell 82 is shaped and dimensioned to receive and support a single fluid valve 120 therein as discussed in more detail below. In addition, each cell 82 and the fluid valve 120 disposed therein is aligned with one of the port pairs 34, and each fluid valve 120 is configured to control fluid flow between the first valve port 21 and the second valve port 51 of a respective port pair 34**.

The wall portions **84(*lr*) in the first lateral region 85 define a one-by-i array of first cells 82(1) and the wall portions 84(*lr*) in the second lateral region define a one-by-(i+1) array of second cells 82(2). As used herein, the variable i represents the number of cells and is an integer greater than zero. In the illustrated embodiment, i is 10 whereby the array of first cells 82(1) includes ten first cells 82(1) and the array of second cells 82(2) includes eleven second cells 82(2). The first cells 82(1) are arranged to be offset relative to the second cells 82(2) in a direction parallel to a rotational axis 162 of the cam shaft 160**.

The valve assembly 5 includes a cam shaft 160 that extends into the valve chamber 80. In the illustrated embodiment, the cam shaft 160 is a rigid rod having a hexagonal cross-sectional shape. The cam shaft 160 is supported for rotation by the assembly housing 10. More specifically, opposed ends of the cam shaft 160 supported for rotation by bearings 165, which in turn are supported by the wall portions **84(*cr*) in the central region 88. In addition, portions of the cam shaft 160 intermediate the opposed ends are supported by wall portions 84(*cr*) that provide plain bearings 89. A first end 160(1) of the cam shaft 160 is connected to an actuator 4 via a gearset (not shown) that is disposed in the actuator housing. The actuator 4 drives the cam shaft 160 to rotate about the cam shaft rotational axis 162. The valve assembly 5 includes an annular shaft seal 106 that surrounds the cam shaft 160 and is disposed at the cam shaft first end 160(1). The shaft seal 106 provides a fluid tight seal between the cam shaft 160 and the assembly housing 10, whereby fluid is prevented from flowing between the central region 88** and an interior space of the actuator housing.

In addition to providing support for the bearings 165, the central region wall portions 84(*cr*) fully enclose the cam shaft 160 and the cams 166. To this end, the central region wall portions 84(*cr*) include an upper wall portion 84(1) that overlies the cam shaft 160 and adjoins the first manifold 20, a lower wall portion 84(2) that underlies the cam shaft 160 and adjoins the second manifold 50, and side wall portions 84(3) that adjoin the cells 82.

The valve assembly 5 includes the cams 166 that are supported on the cam shaft 160. Each cam has a central opening 169 through which the cam shaft 160 extends. The central opening is shaped and dimensioned so that the cam rotates in concert with the cam shaft 160. In the illustrated embodiment, the central opening is hexagonal in cross-sectional shape to correspond to the shape of the cam shaft 160. However, in other embodiments, splines, keys or other known structures may be used to fix the cams 166 to the cam shaft 160.

The cam shaft 160 includes a cam 166 for each fluid valve 120. The cams 166 are arranged on the cam shaft 160 so that each cam 166 is aligned with a unique one of the cells 82(1), 82(2), and thus also with a unique one of the fluid valves 120. Thus, the cams 166 are spaced apart long the cam shaft 160 in a direction parallel to the cam shaft rotational axis 162. The cams 166 are individually shaped and dimensioned to engage the corresponding fluid valve 120 in certain rotational orientations of the cam shaft 160 relative to the assembly housing 10. Each cam 166 may include one or more cam lobes 168 and may have a different peripheral shape and dimensions than adjacent cams 166. Some cams 166 may have the same peripheral shape and dimensions as other cams 166 but may be fixed to the cam shaft 160 in a different angular orientation than the other cams 166.

Referring to FIGS. 7-15, in the illustrated embodiment, the fluid valves 120 are sliding gate valves. Actuation of the cam shaft 160 permits each cam 166 to move a movable plate 141 of a corresponding fluid valve 120. In the valve assembly 5, a sliding gate fluid valve 120 is disposed in each of the cells 82 and is configured to control fluid flow between the first valve port 21 and the second valve port 51 of the respective port pair 34. Each sliding gate fluid valve 120 includes a first stationary plate 121, a second stationary plate 131 and a movable plate 141 disposed between the first stationary plate 121 and the second stationary plate 131 in a stacked or layered configuration. Each sliding gate fluid valve 120 includes an elastic member 180 that biases the sliding gate fluid valve 120 to a normally-closed position, and each sliding gate fluid valve 120 includes a push rod 190 that extends between the sliding gate fluid valve 120 and a respective cam 166 of the cam shaft 160. The sliding gate fluid valve 120 will now be described in detail.

Although assembled in the sliding gate fluid valve 120 in opposite orientations, the first stationary plate 121 and the second stationary plate 131 are identical in shape and dimension. For this reason, common elements are referred to with common reference numbers and only the first stationary plate 121 will be described in detail.

The first stationary plate 121 is a rigid, rectangular plate having a length dimension $L_S$ that is greater than its width dimension $W_S$, and a width dimension $W_S$ that is greater than its thickness $T_S$ (e.g., height) dimension. For example, in the illustrated embodiment, the length dimension $L_S$ is at least three times the width dimension $W_S$, and the width dimension $W_S$ is at least five times the thickness dimension $T_S$.

The first stationary plate 121 has a first working surface 123 that faces the respective port, and a second working surface 124 that is opposed to the first working surface 123 and faces the movable plate 141. In the case of the first stationary plate 121, the first working surface 123 faces the first valve port 21, whereas in the case of the second stationary plate 131, the first working surface 123 faces the second valve port 51. The first and second working surfaces 123, 124 are parallel to each other and are spaced apart a distance corresponding to the thickness $T_S$ of the first stationary plate 121.

The first stationary plate 121 has at least one first plate through-opening 122 that extends between the first working surface 123 and the second working surface 124. In the illustrated embodiment, the first stationary plate 121 has four first plate through-openings 122 that are spaced apart along the length dimension $L_S$ of the first stationary plate 121. Each first plate through opening 122 has a rectangular profile when viewed facing the first working surface 123 but is not limited to having a profile of this shape.

The first stationary plate 121 includes an outer annular ridge 125 that protrudes from the first working surface 123 and encircles all the first plate through openings 122. In the case of the first stationary plate 121, outer annular ridge 125 locates a first valve seal 100 with respect to the first working surface 123 of the first stationary plate 121. The first valve seal 100 provides a fluid-tight seal between the first stationary plate 121 (e.g., the sliding gate fluid valve 120) and the first manifold 20. In the case of the second stationary plate 131, the outer annular ridge 125 locates a second valve seal 102 with respect to the first working surface 123 of the second stationary plate 131. The second valve seal 102 provides a fluid-tight seal between the second stationary plate 131 (e.g., the sliding gate fluid valve 120) and the second manifold 50.

The first stationary plate 121 includes inner annular ridges 126 that protrude from the second working surface 124. An inner annular ridge 126 encircles each first plate through opening 122. Thus, in the illustrated embodiment, the first stationary plate 121 includes four inner annular ridges 126. The terminal end 126(1) of each inner annular ridge is planar and abuts the movable plate 141. In the case of the first stationary plate 121, the planar terminal end 126(1) forms a fluid tight seal between the first stationary plate 121 and the movable plate 141. In the case of the second stationary plate 131, the planar terminal end 126(1) forms a fluid tight seal between the second stationary plate 131 and the movable plate 141. By this configuration, the inner annular ridges 126 reduce sliding friction between the (fixed) first and second stationary plates 121, 131 and the movable plate 141 during valve operation as compared to a stationary plate having no inner annular ridges.

Each first and second stationary plate 121, 131 of a given fluid valve 120 is disposed in a corresponding cell 82, and each first and second stationary plate 121, 131 is fixed relative to the wall portions 84(*lr*) that define the cell 82. To this end, the wall portions 84(*lr*) that provide each cell 82 are shaped and dimensioned so that each first and second stationary plate 121, 131 is stationary within the cell 82. For example, the wall portions 84(*lr*) define a rectangular opening that receives the first stationary plate 121 therein in a clearance fit (e.g., each cell 82 is formed to closely follow the contours and dimensions of the first stationary plate 121 disposed therein).

The movable plate 141 is a rigid, generally rectangular plate having a length dimension $L_M$ that is greater than its width dimension $W_M$, and a width dimension $W_M$ that is greater than its thickness $T_M$ (e.g., height) dimension. For example, in the illustrated embodiment, the length dimension $L_M$ is at least three times the width dimension $W_M$, and the width dimension $W_M$ is at least five times the thickness dimension $T_M$. The overall dimensions $L_M$, $W_M$, $T_M$ of the movable plate are substantially the same as the overall dimensions $L_S$, $W_S$, $T_S$ of the first and second stationary plates 121, 131.

The movable plate 141 has a first working surface 143 that faces the respective first stationary plate 121, and a second working surface 144 that is opposed to the first working surface 143 and faces the second stationary plate 151. The first and second working surfaces 143, 144 are parallel to each other and are spaced apart a distance corresponding to the thickness Ty of the movable plate 141. In addition, the first and second working surfaces 143, 144 are planar (e.g., lie in a plane) and substantially smooth.

The movable plate 141 has a peripheral surface 145 that extends between the first and second working surfaces 143, 144. The peripheral surface 145 includes a first end surface 145(1) that faces the cam shaft 160, a second end surface 145(2) that is opposite the first end surface 145(1), and a pair side surfaces 145(3), 145(4) that extend in the length direction between the first end surface 145(1) and the second end surface 145(2).

The width of the movable plate 141 is non-uniform. In particular, the width of a central portion of the movable plate 141 is greater than the width of the movable plate 141 at each of the first and second end surfaces 145(1), 145(2). Shoulders 145(6) are formed at the transitions between widths. The shoulders 145(6) are much closer to the respective the first and second end surfaces 145(1), 145(2) than to a mid-length of the movable plate 141. As seen when the movable plate 141 is viewed in top plan view (e.g., in a direction facing the first working surface 143), the central portion of the movable plate 141 is rectangular and has a width $W_M$ that corresponds to the width $W_S$ of the stationary plates 121, 131.

The second end surface 145(2) includes a locating post 146 that protrudes outward toward the cam shaft 160. The locating post 146 is shaped and dimensioned to engage with an end of the elastic member 180 that extends between a cam 166 of the cam shaft 160 and the second end surface 145(2) in such a way that the locating post 146 positions the elastic member 180 with respect to the second end surface 145(2) and retains the elastic member 180 thereon. For example, when the elastic member 180 is a coil spring, the locating post 146 is shaped and dimensioned to be received in the open end of the coil spring. In the illustrated embodiment, the locating post 146 is rectangular in cross-sectional shape and has a maximum dimension corresponding to an inner diameter of the coil spring.

The central portion of the movable plate 141 has at least one movable plate through-opening 142 that extends between the first working surface 143 and the second working surface 144. In the illustrated embodiment, the movable plate 141 has four movable plate through-openings 142 that are spaced apart along the length dimension $L_M$ of the movable plate 141. Each movable plate through opening 142 has a profile shape when viewed facing the first working surface 143 that is the same as that of the first plate through-opening 122. Thus, in the illustrated embodiment, the movable plate through-openings 142 have a profile that is rectangular.

Figures 13, 14:
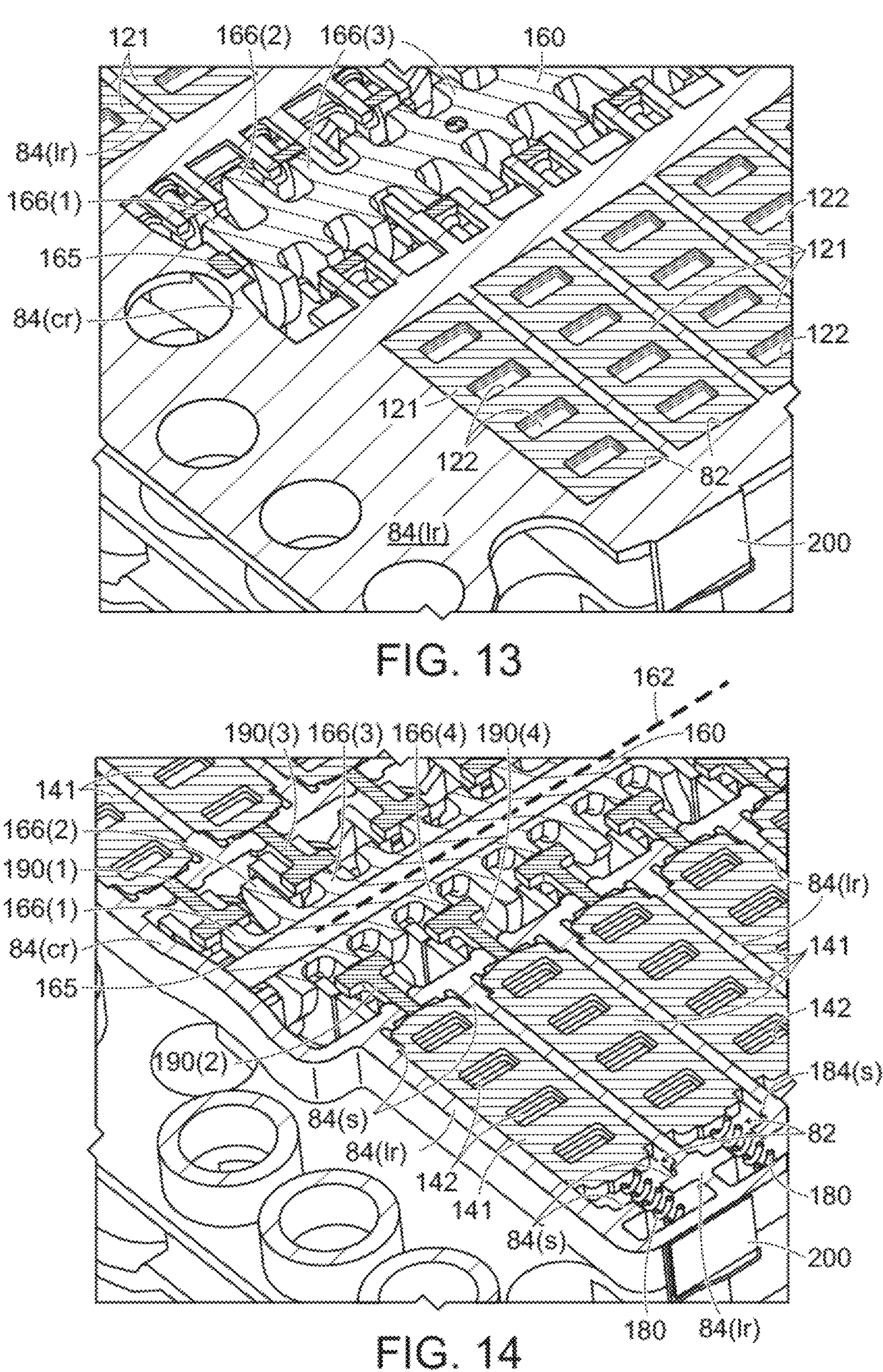
FIG. 13 is a cross-sectional view of the fluid valve assembly in which the section is taken in a plane parallel to the plane in which the movable plate moves, the plane passing through the first stationary plate.
FIG. 14 is a cross-sectional view of the fluid valve assembly in which the section is taken in the plane in which the movable plate moves, the plane passing through the movable plate.
Figure 15:
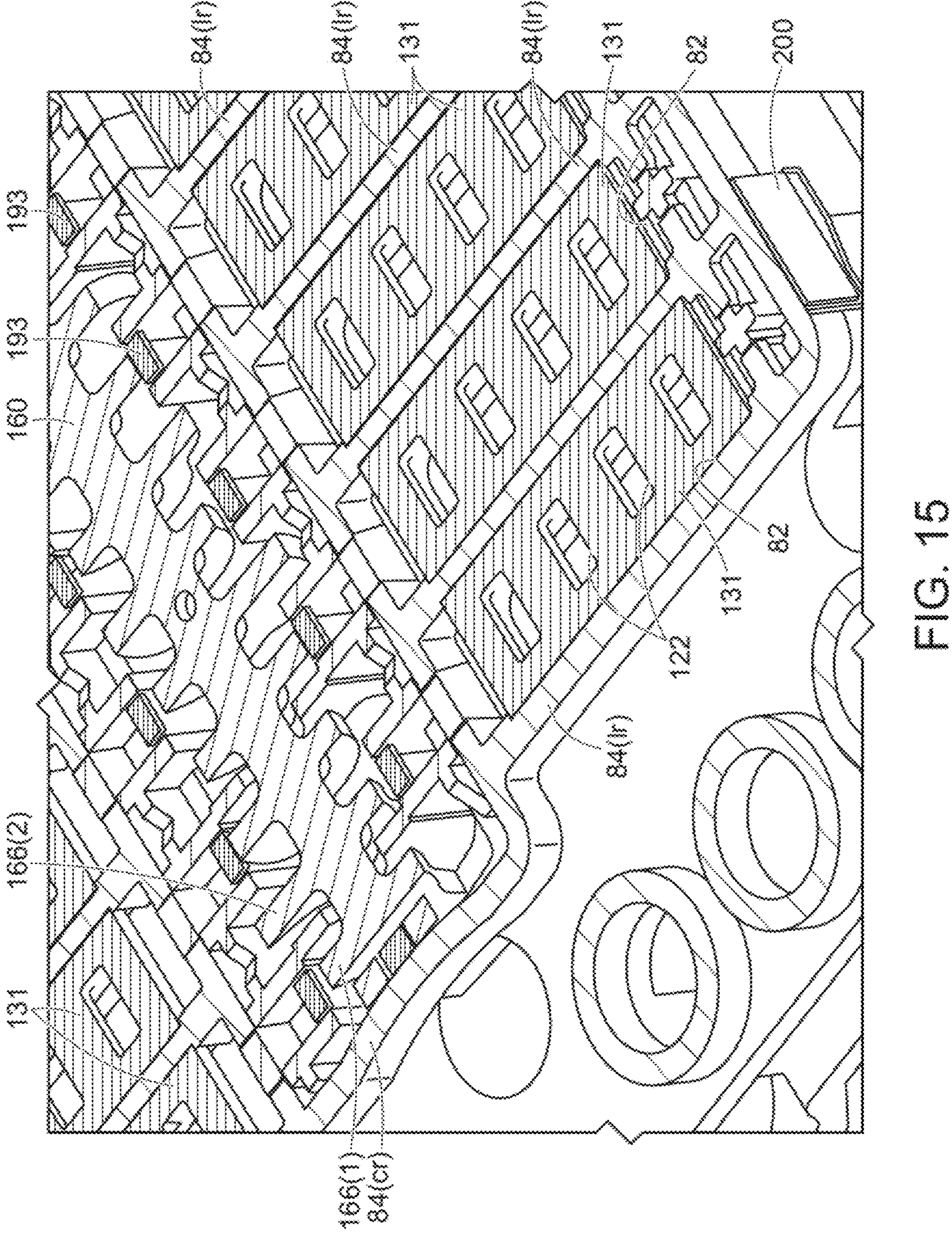
FIG. 15 is a cross-sectional view of the fluid valve assembly in which the section is taken in a plane parallel to the plane in which the movable plate moves, the plane passing through the second stationary plate.

The movable plate 141 is moveable relative to the first and second stationary plates 121, 131 within a plane 150 that is parallel to the first stationary plate 121. To this end, in the vicinity of the movable plate 141, the wall portions 84(*lr*) that provide each cell 82 have substantially the same shape as the movable plate 141(FIG. 14). Although the wall portions 84(*lr*) have the same width dimension as the width dimension $W_M$ of the movable plate 141, the wall portions 84(*lr*) define an opening that is longer than the length dimension Ly to permit movement of the movable plate 141 within the plane 150 in a radial direction of the cam shaft 160. Because the wall portions 84(*lr*) in the vicinity of the movable plate 141 have substantially the same shape as the movable plate 141, the wall portions 84(*lr*) define internal shoulders 84(*s*) that serve as stops to limit the extent of translation of the moveable plate 141 within the cell 82.

Within each cell 82, the first stationary plate 121 is fixed relative to the wall portions 84(*lr*) so as to face the corresponding first valve port 21. Similarly, the second stationary plate 131 is fixed relative to the wall portions 84(*lr*) so as to face the corresponding second valve port 51 and such that the second plate through openings 122 are aligned with the first plate through-openings 122 in a direction that is parallel to the port pair axis 36 and perpendicular to the plane 150. The movable plate 141 is disposed in the cell 82 between the first stationary plate 121 and the second stationary plate 131 and is moveable relative to the first and second stationary plates 121, 131 within the plane 150. In particular, the movable plate 141 is constrained by the wall portions 84(*lr*) and the stationary plates 121, 131 to move within the plane 150 in a direction that is parallel to the length dimension $L_M$. In the illustrated embodiment, the rotational axis 162 of the cam shaft 160 resides in the plane 150 and the movement direction corresponds to a radius of the cam shaft 160.

Each sliding gate fluid valve 120 includes a push rod 190 that extends between an inner end of the movable plate 141, e.g., the movable plate first end surface 145(1), and a peripheral surface of a cam 166 of the cam shaft 160. Each push rod 190 is an elongate, rigid body that includes a head portion 193 and a shank portion 194 that protrudes from the head portion 193. The head portion 193 includes a smoothly curved convex surface 193(1) that faces the cam 166. The shank portion 194 protrudes from a side of the head portion 193 opposite the convex surface 193(1). In the illustrated embodiment, the shank portion 194 is cylindrical and has a uniform diameter that is much smaller than a diameter of the head portion 193. The head portion 193 is disposed in the central region 88 of the valve chamber 80 whereas a proximal end 194(1) of the shank portion 194 is disposed in a lateral region 85 or 86 of the valve chamber 80. To this end, the shank portion 194 protrudes through an opening in the cell 82 and the shank portion proximal end end 194(1) abuts the movable plate first end surface 145(1).

Each sliding gate fluid valve 120 includes an elastic member 180 such as a coil spring that is disposed in the cell 82. The coil spring 180 is disposed under compression between the movable plate second end surface 145(2) and the facing wall portion 84(*lr*). More specifically, one end of the coil spring 180 abuts the wall portion 84(*lr*) and an opposed end of the coil spring 180 abuts the movable plate second end surface 145(2) while engaging the locating post 146. By this configuration, the centerline of the coil spring 180 resides in the plane 150. In addition, coil spring 180 biases the movable plate 141 along with the push rod 190 toward the cam shaft 160. As a result, the head portion 193 of the push rod 190 is urged by the coil spring 180 against the cam surface of the corresponding cam 166 whereby the push rod head portion 193 abuts and follows the peripheral surface of the cam 166 as the cam shaft 160 rotates.

Upon rotation of the cam shaft 160 about the rotational axis 162, the movable plate 141 of each fluid valve 120 is driven by the cam 166 to reciprocate along a movement axis 148 that is perpendicular to the rotational axis 162 and coincides with a radius of the cam shaft 160. In the illustrated embodiment, the movable plate 141 is movable (e.g., reciprocates) between a first position and a second position. In the first position (FIG. 12), the movable plate through-openings 142 are aligned with the through-openings 122 of the first and the second stationary plates 121, 131 and fluid is permitted to flow through the sliding gate fluid valve 120 between the first valve port 21 and the second valve port 51. In the second position (FIG. 11), the movable plate through-openings 142 are not aligned with the through-openings 122 of the first and the second stationary plates 121, 131 and fluid is prevented from flowing through the sliding gate fluid valve 120 between the first valve port 21 and the second valve port 51. Since no overlap exists between the movable plate through-openings 142 and the stationary plate through-openings 122 fluid flow through the fluid valve 120 is prevented when the movable plate 141 is in the second position. The fluid valves 120 are normally closed since the movable plate 141 is biased to the second position by an elastic member that is coplanar with the plane.

The amount of fluid flow through the fluid valve 120 can be made variable by selectively positioning the movable plate 141 at a location between the first position and the second position.

Each sliding gate fluid valve 120 includes annular valve seals 100, 102 that are disposed between the fluid valve 120 and the first and second manifolds 20, 50. In particular, each sliding gate fluid valve 120 includes the first valve seal 100 that is disposed between the first working surface 123 of the first stationary plate 121 and the first manifold 20, providing a fluid tight seal therebetween. The position of the first valve seal 100 with respect to the first working surface 123 of the first stationary plate 121 is maintained by the outer annular ridge 125, which the first valve seal 100 surrounds and abuts. The first valve seal 100 surrounds the corresponding first valve port 21 as well as the first stationary plate through openings 122.

Each sliding gate fluid valve 120 includes the second valve seal 102 that is disposed between the first working surface 123 of the second stationary plate 131 and the second manifold 50, providing a fluid tight seal therebetween. The position of the second valve seal 102 with respect to the first working surface 123 of the second stationary plate 131 is maintained by the outer annular ridge 125, which the second valve seal 102 surrounds and abuts. The second valve seal 102 surrounds the corresponding second valve port 51 as well as the second stationary plate through openings 122.

When the movable plate 141 is in the first position or between the first and second positions, fluid is permitted to flow through the sliding gate fluid valve 120 in one of a first direction and a second direction. The first direction corresponds to fluid flow from the first port 21 to the second port 51, and the second direction corresponds to fluid flow from the second port 51 to the first port 21, whereby the second direction is opposite the first direction, and the first direction and the second direction are perpendicular to the plane 150. Because each sliding gate fluid valve 120 includes the first valve seal 100 that is disposed between the first working surface 123 of the first stationary plate 121 and the first manifold 20 and the second valve seal 102 that is disposed between the first working surface 123 of the second stationary plate and the second manifold 50, each fluid valve 120 has bi-directional sealing. Since each fluid valve 120 includes bi-directional sealing, pressurized fluid can flow through each fluid valve from the first port 21 to the second port 51 of each port pair 34, and from the second port 51 to the first port 21 of each port pair 34, in a fluid-tight manner. Moreover, the sealing efficiency of the downstream seal 100 or 102 increases as the fluid pressure increases.

In the illustrated embodiment, each sliding gate fluid valve 120 is sandwiched between the first valve seal 100 and the second valve seal 102. Because the first and second valve seals 101, 102 are elastic, the first and second valve seals 101, 102 cooperate to provide elastic forces that compress the movable plate 141 between the first and second stationary plates 121, 131.

Each of the first valve seals 100 and the second valve seals 102 may be formed of an elastomer that is compatible with automotive coolant, such as ethylene propylene diene monomer (EPDM). In the illustrated embodiment, the first and second valve seals 100, 102 have a "U" cross-sectional shape that opens facing the respective manifold 20, 50. In other embodiments, the first and second valve seals 100, 102 may have other cross-sectional shapes, such as, but not limited to, circular, rectangular, oval, "X" or "I" shapes.

As previously described, the valve assembly 5 includes two arrays of fluid valves 120, where a first array is disposed in the valve chamber first lateral region 85 on a first side of the cam shaft 160 and a second array is disposed in the valve chamber second lateral region 86 on an opposed, second side of the cam shaft 160. Each fluid valve 120 is disposed in a respective cell 82 in the valve chamber 80 in alignment with a port pair 34 such that for certain rotational orientations of the cam shaft 160 relative to the assembly housing 10, at least one cam 166 engages a corresponding one of the fluid valves 120 in such a way that the one of the fluid valves 120 is movable between the first position in which fluid is permitted to flow between the first valve port 21 and the second valve port 51 of the port pair 34, and the second position in which fluid is prevented from flowing between the first valve port 21 and the second valve port 51 of the port pair 34.

Each cell 82 is arranged so that the length dimensions Ly of the valve movable plates 141 extend in a direction perpendicular to the cam shaft rotational axis 162 and so that plane 150 in which the movable plates 141 resides also includes the rotational axis 162. Thus, the movable plates 141 of the sliding gate fluid valves 120 of the first and second lateral regions 85, 86 are coplanar (FIG. 14). The movable plates 141 of the sliding gate fluid valves 120 of the first lateral region 85 are disposed on a first side of the rotational axis 162, and the movable plates 141 of the sliding gate fluid valves 120 of the second lateral region 86 are disposed on the opposed side of the rotational axis 162.

The cam shaft 160 includes multiple cams 166, for example 21 cams 166 in the illustrated embodiment. Each cell 82 is aligned with a single cam 166 which drives the movable plate 141 disposed in the cell 82. The cells 82 of the first lateral region 85 are offset from the cells 82 of the second lateral region 86 in a direction parallel to the rotational axis 162 so that the push rod 190(1) of the first cell 82 of the second lateral region 86 contacts the first cam 166(1), the push rod 190(2) of the first cell 82 of the first lateral region 85 contacts the second cam 166(2), the push rod 190(3) of the second cell 82 of the second lateral region 86 contacts the third cam 166(3), the push rod 190(4) of the second cell 82 of the first lateral region 85 contacts the fourth cam 166(4), etc. (FIG. 14). Thus, the movable plate 141 of a sliding gate fluid valve 120 of the first lateral region 85 and a movable plate 141 of a sliding gate fluid valve 120 of the second lateral region 86 are coplanar and offset relative to each other along the rotational axis 162, and each movable plate 141 is biased toward a corresponding cam 166 via a respective elastic member 180.

Actuation of the cam shaft 160 permits each cam 166 to move a valve body, in this embodiment a movable plate 141, of a corresponding fluid valve 120, whereby the timing, sequencing and pattern of fluid flow through the cooling system 2 can be precisely controlled. The cam shaft 160 and cams 166 are arranged to open and close the fluid valves 120 in such a way that, in cooperation with the first fluid passageways 30 of the first manifold 20 or the second fluid passageways 60 of the second manifold 50, multiple ones of the sliding gate fluid valves 120 may allow direction of fluid to a single other sliding gate fluid valve 120 and/or a single one of the sliding gate fluid valves 120 may direct fluid to multiple other ones of the sliding gate fluid valves 120, depending on operating conditions of the system.

Figure 16:
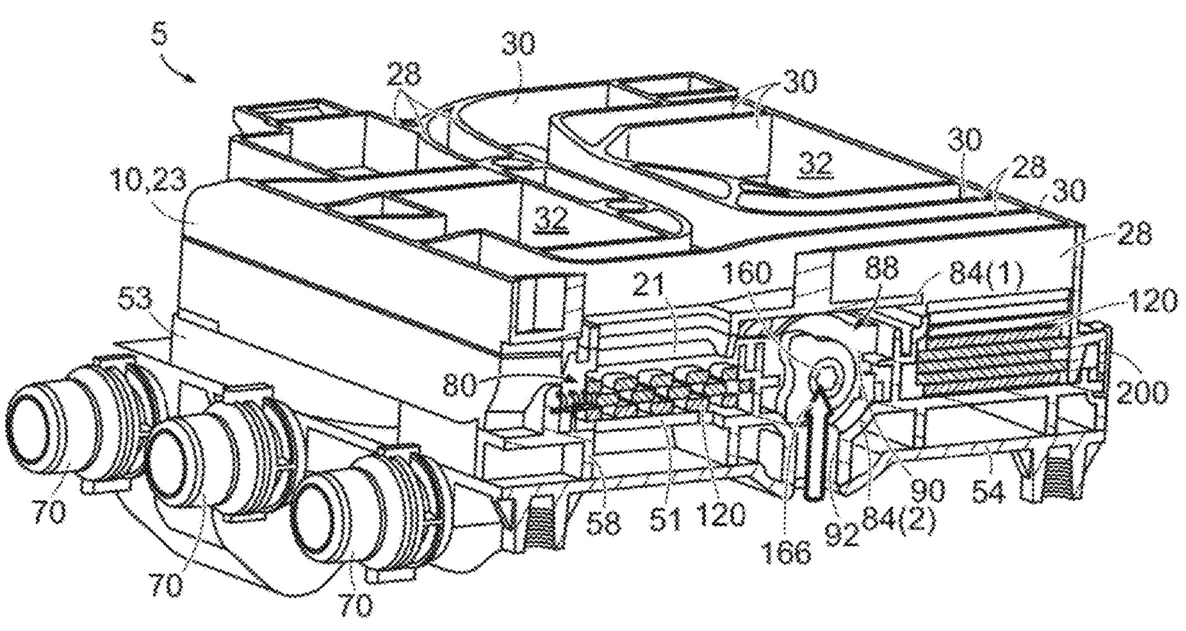
FIG. 16 is a cross-sectional view of the cam-driven fluid valve assembly as seen along line 16-16 of FIG. 3.
Figure 17:
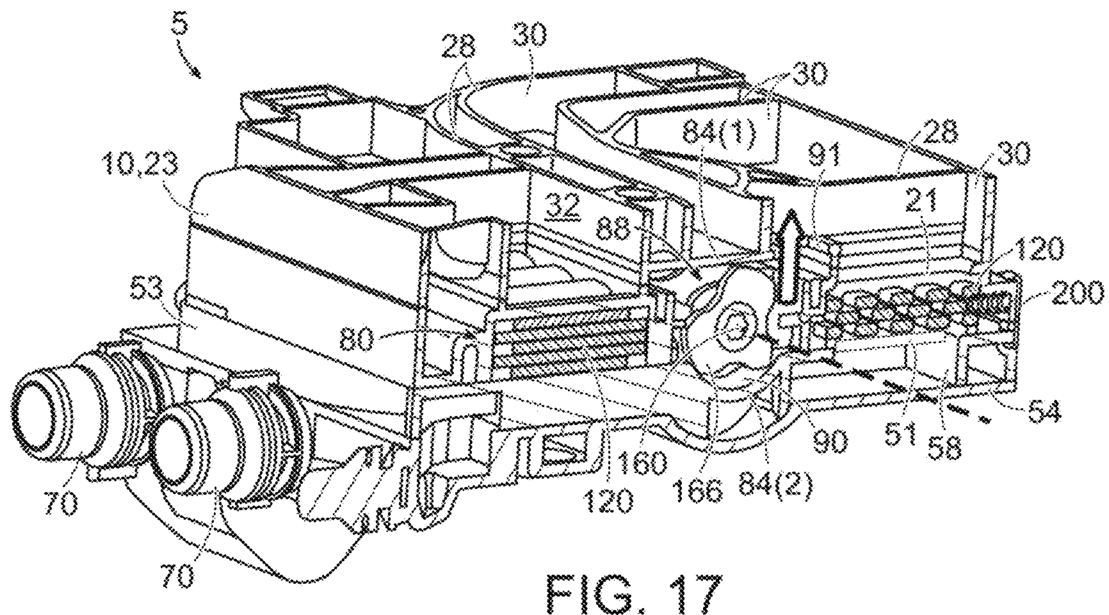
FIG. 17 is a cross-sectional view of the cam-driven fluid valve assembly as seen along line 17-17 of FIG. 3.

Referring to FIGS. 16 and 17, in some applications it may be beneficial to provide a fluid connection between one or more fluid passageways 30 of the first fluid manifold 20 and one or more fluid passageways 70 of the second fluid manifold 50 without passing through one of the sliding gate fluid valves 120. In the illustrated embodiment, the valve chamber central region 88, which is an enclosure that adjoins the first and second manifolds 20, 50 and has an axial dimension that is substantially the same as the axial dimension of the assembly housing 10, provides a third fluid passageway 90 through the valve assembly 5. The valve chamber central region 88 includes first manifold ports 91 that permit fluid communication between the third fluid passageway 90 (e.g., the valve chamber central region 88) and the first manifold 20. In addition, the valve chamber central region 88 includes second manifold ports 92 that permit fluid communication between the third fluid passageway 90 (e.g., the valve chamber central region 88) and the second manifold 50. The first and second manifold ports 91, 92 permit fluid to flow in a direction parallel to the port pair axis 36. The number of first and second manifold ports 91, 92 provided in the valve assembly 5 depends on the requirements of the specific application.

Figure 7:
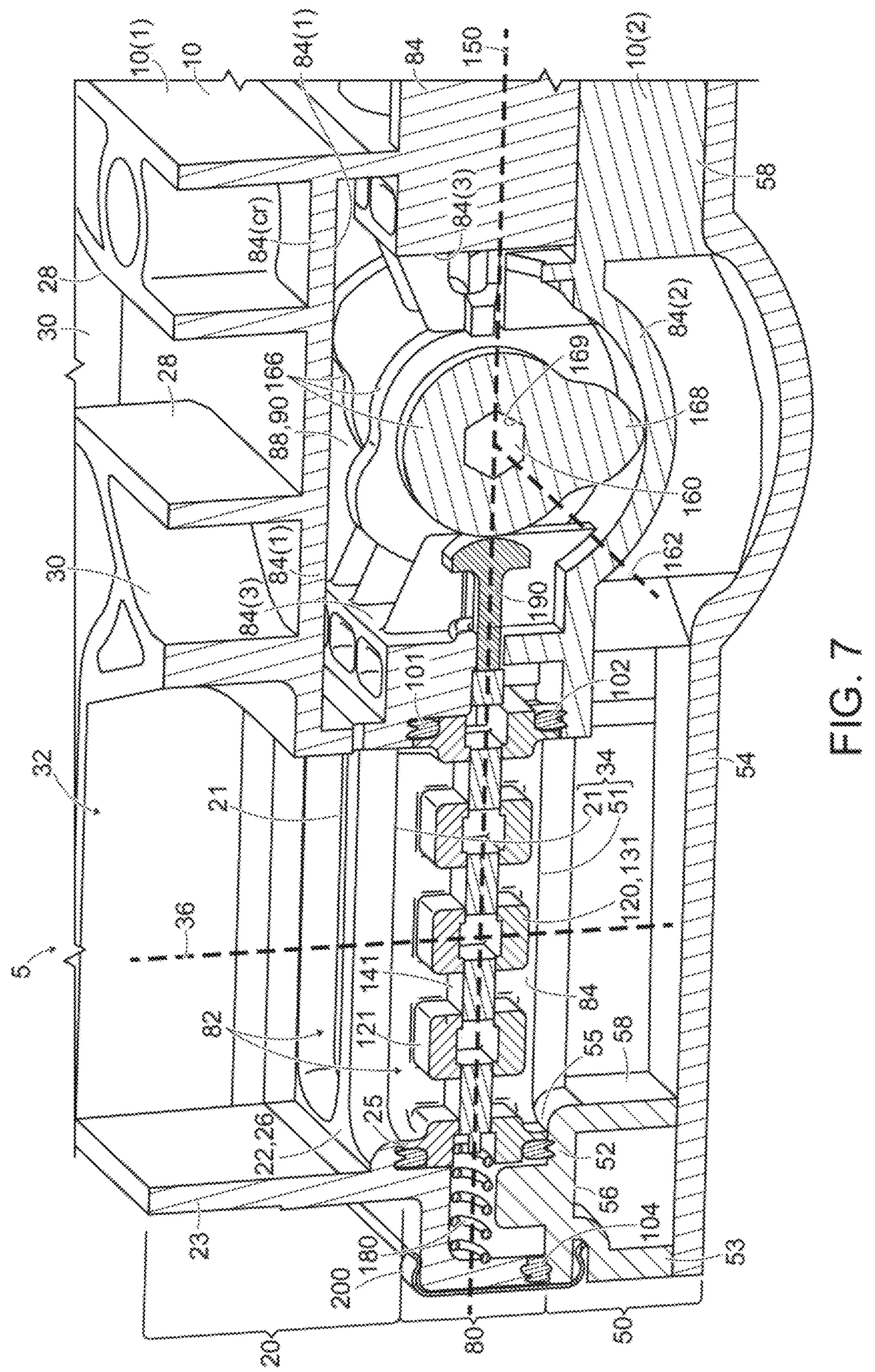
FIG. 7 is an enlarged cross-sectional view of a portion of the cam-driven fluid valve assembly.
Figures 8, 9:
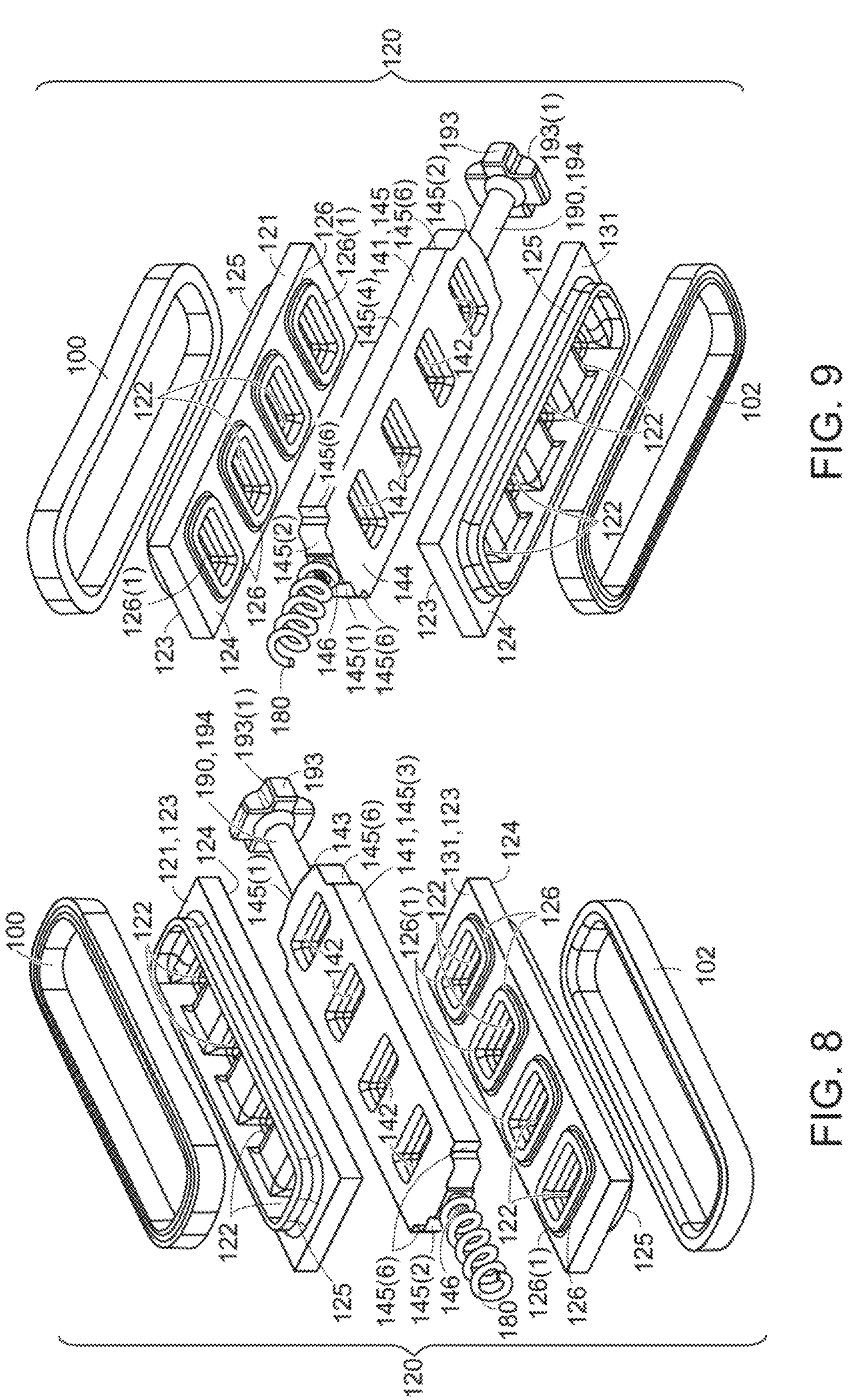
FIG. 8 is an exploded top perspective view of the sliding gate fluid valve.
FIG. 9 is an exploded bottom perspective view of the sliding gate fluid valve.
Figure 10:
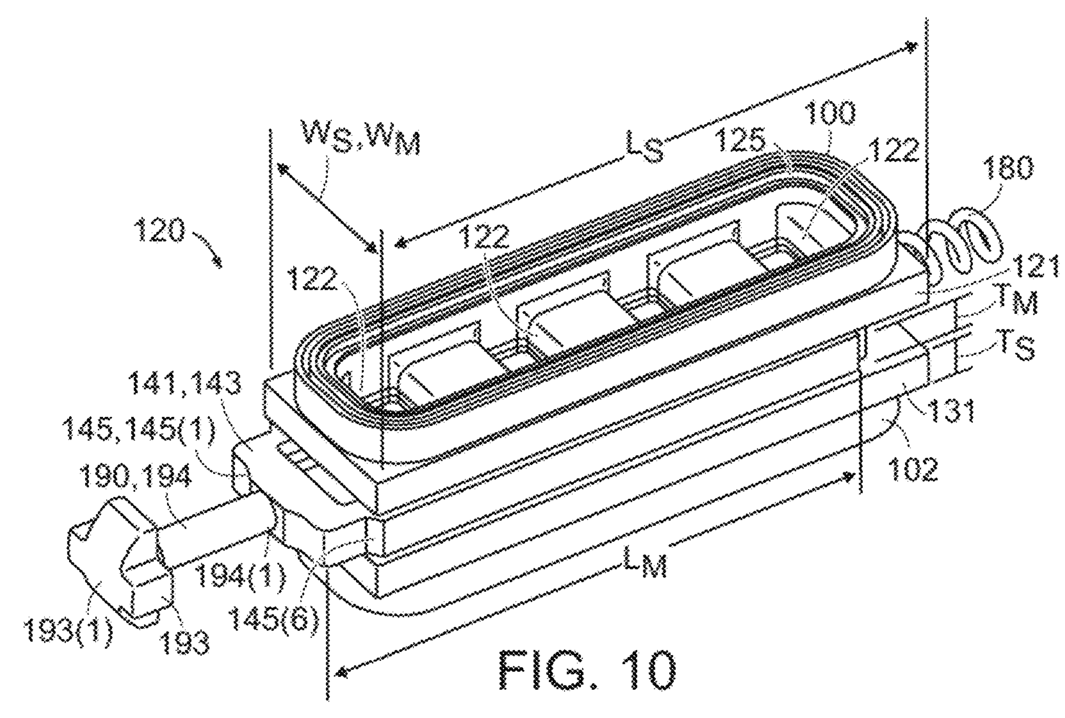
FIG. 10 is perspective view of the sliding gate fluid valve.
Figure 11:
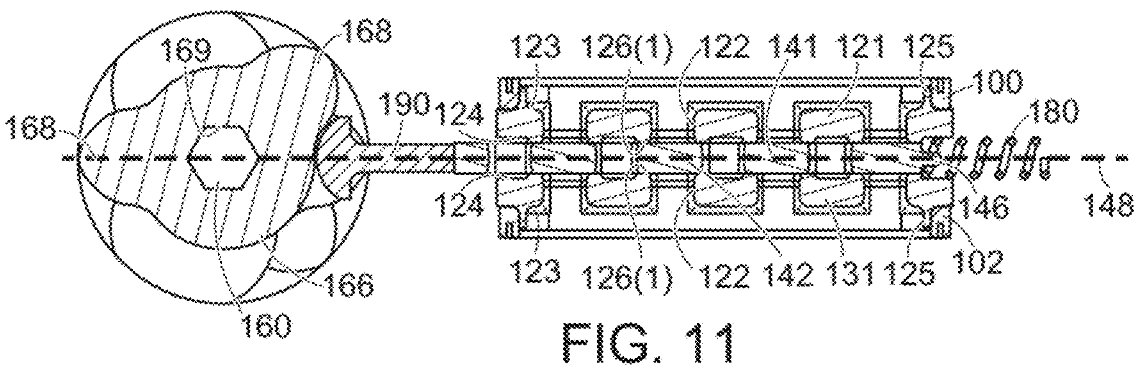
FIG. 11 is a cross-sectional view of the sliding gate fluid valve with the moving plate shown in the second position in which fluid is prevented from flowing through the fluid valve.
Figure 12:
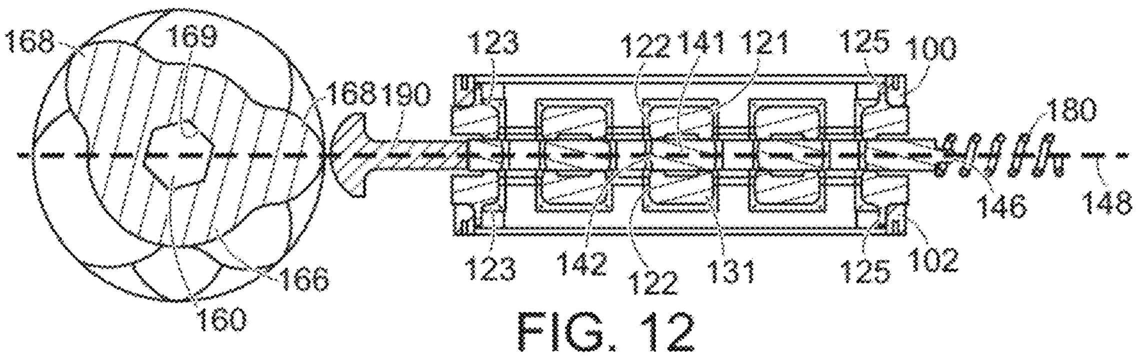
FIG. 12 is a cross-sectional view of the sliding gate fluid valve with the moving plate shown in the first position in which fluid is permitted to flow through the fluid valve.

Referring to FIGS. 1 and 7, the valve assembly housing 10 may be formed in multiple pieces, for example by injection molding, and then assembled. In some embodiments, the individual housing elements that combine to form the valve assembly housing 10 may be retained in the assembled configuration using fasteners. For example, the valve assembly housing 10 may include a first housing portion 10(1) that includes the first manifold 20 and the valve chamber 80, and a second housing portion 10(2) that includes the second manifold 50. In the illustrated embodiment, the first and second housing portions 10(1), 10(2) are retained in the assembled configuration using clips 200 and fasteners such as bolts 202. This approach facilitates assembly by allowing the cells 82 to be exposed thereby permitting the fluid valves 120 to be easily positioned in the cells 82.

In the illustrated embodiment, the valve assembly 5 includes a housing seal 104 that is disposed between wall portions 84 of the valve chamber 80 and the second manifold 50 (e.g., between the first housing portion 10(1) and the second housing portion 10(2)). The housing seal 104 has a generally rectangular profile and may include internal and external seal loops and is configured to retain fluid within predefined areas of the valve assembly housing 10. The housing seal 104 may be formed of an elastomer that is compatible with automotive coolant, such as ethylene propylene diene monomer (EPDM). In the illustrated embodiment, the housing seal 104 has a generally rectangular cross-sectional shape in which sealing surfaces include a pair of parallel grooves that extend along a circumference of the housing seal 104. In other embodiments, the housing seal may have other cross-sectional shapes, such as, but not limited to, circular, oval, "H", "X" or "I" shapes. In some embodiments, the clips 200 are configured to place the housing seal 104 under compression, thereby ensuring a fluid tight seal between the first and second housing portions 10(1), 10(2).

In the illustrated embodiment, the fluid valves 120 are sliding gate valves and each fluid valve 120 is driven to move within the plane 150 via rotation of the cams 166, but the cam-driven fluid valve assembly 5 is not limited to being implemented via a sliding gate valve. For example, in other embodiments, the sliding gate valves may be replaced by another type of valve such as lift valves, disk valves, plug valves, etc.

Although the illustrated embodiment shows that each fluid valve 120 is a sliding gate valve, the cam-driven fluid valve assembly 5 is not limited to having only sliding gate valves. For example, in some embodiments, multiple types of valves may be incorporated into the assembly housing 10. In some embodiments, at least one of the fluid valves is a sliding gate valve.

In the illustrated embodiment, the first and second stationary plates 121, 131 have a rectangular profile when viewed in a direction facing the first working surface 123. However, the first and second stationary plates are not limited to having this shape. For example, in some embodiments, the corners of the rectangular profile may be rounded. In other embodiments, the first and second stationary plates 121, 131 may have an oval or irregularly-shaped profile.

Selective illustrative embodiments of the cam-driven valve system are described above in some detail. It should be understood that only structures considered necessary for clarifying the cam-driven valve system have been described herein. Other conventional structures, and those of ancillary and auxiliary components of the cam-driven valve system, are assumed to be known and understood by those skilled in the art. Moreover, while a working example of the cam-driven valve system have been described above, the cam-driven valve system is not limited to the working example described above, but various design alterations may be carried out without departing from the cam-driven valve system as set forth in the claims.

We claim:

1. A valve assembly comprising:

an assembly housing having ports, each port configured to permit fluid communication between an environment of the assembly housing and an interior space of the assembly housing;

a cam shaft supported on the assembly housing, the cam shaft configured to rotate about a rotational axis, the cam shaft including a cam that is supported on the cam shaft and rotates in concert with the cam shaft; and a sliding gate valve that includes a first stationary plate having a first plate through-opening, the first stationary plate being disposed in the assembly housing and fixed relative to the assembly housing so as to face a first one of the ports, a second stationary plate having a second plate through-opening, the second stationary plate being parallel to the first stationary plate, disposed in the assembly housing and fixed relative to the assembly housing so as to face a second one of the ports and such that the second plate through opening is aligned with the first plate through-opening, and a movable plate having a movable plate through-opening, the movable plate being disposed in the assembly housing between the first stationary plate and the second stationary plate, the movable plate being moveable relative to the first stationary plate within a plane that is parallel to the first stationary plate, wherein the rotational axis is disposed in the plane, the movable plate is configured to be driven by the cam to move within the plane, and at least one sliding surface of the sliding gate valve includes a protruding ridge having a terminal end that is spaced apart from the at least one sliding surface and abuts a facing surface of the sliding gate valve, the at least one sliding surface of the sliding gate valve includes portions that do not form the protruding ridge and are spaced apart from the facing surface of the sliding gate valve, the protruding ridge reducing the sliding friction between the movable plate and a respective one of the first stationary plate and the second stationary plate.

2. The valve assembly of claim 1, wherein the movable plate is configured to be driven by the cam to reciprocate along a radius of the cam shaft.

3. The valve assembly of claim 1, wherein the movable plate is movable between a first position in which the movable plate through-opening is aligned with the first plate through-opening and the second plate through-opening permitting fluid flow through the valve, and a second position in which no alignment exists between the movable plate through-opening and the first plate through-opening and the second plate through-opening whereby fluid flow through the valve is prevented.

4. The valve assembly of claim 3, wherein the movable plate is biased to the second position by an elastic member that is coplanar with the plane.

5. The valve assembly of claim 3, wherein the amount of fluid flow through the valve is made variable by selectively positioning the movable plate at a location between the first position and the second position.

6. The valve assembly of claim 1, comprising:

a push rod that is disposed between an inner end of the movable plate and a peripheral surface of the cam; and an elastic member disposed between an outer end of the movable plate and an inner surface of the assembly housing, wherein the movable plate and the push rod are biased toward the cam via a spring force of the elastic member, and when the cam shaft rotates about the rotational axis, the cam drives the movable plate via the push rod to move within the plane.

7. The valve assembly of claim 1, comprising:

a first valve seal that is disposed between the first stationary plate and the assembly housing, the first valve seal surrounding the first one of the ports; and a second valve seal that is disposed between the second stationary plate and the assembly housing, the second valve seal surrounding the second one of the ports.

8. The valve assembly of claim 1, wherein the valve assembly is configured so that, in certain positions of the movable plate, fluid is permitted to flow through the sliding gate valve in one of a first direction and a second direction, the second direction is opposite the first direction, the first direction and the second direction are perpendicular to the plane, and the valve assembly comprises:

a first valve seal that provides a fluid tight seal between the first stationary plate and the assembly housing regardless of direction of fluid flow through the valve; and a second valve seal that provides a fluid tight seal between the second stationary plate and the assembly housing regardless of direction of fluid flow through the valve.

9. The valve assembly of claim 1, wherein the valve assembly is configured to provide bi-directional sealing of the sliding gate valve such that a fluid tight seal exists between the sliding gate valve and the assembly housing regardless of direction of fluid flow through the valve.

10. The valve assembly of claim 1, wherein the cam comprises a first cam and a second cam, and the sliding gate valve comprises a first sliding gate valve and a second sliding gate valve, wherein the movable plate of the first sliding gate valve is configured to be actuated by the cam shaft via the first cam, and the movable plate of the second sliding gate valve is configured to be actuated by the cam shaft via the second cam.

11. The valve assembly of claim 10, wherein the movable plate of the first sliding gate valve and the movable plate of the second sliding gate valve are coplanar and on opposed sides of the rotational axis.

12. The valve assembly of claim 10, wherein the movable plate of the first sliding gate valve and the movable plate of the second sliding gate valve are coplanar and on a common side of the rotational axis.

13. The valve assembly of claim 10, wherein the movable plate of the first sliding gate valve and the movable plate of the second sliding gate valve are coplanar and offset relative to each other along the rotational axis.

14. The valve assembly of claim 10, wherein the movable plate of the first sliding gate valve is biased toward the first cam via a first elastic member and the movable plate of the second sliding gate valve is biased toward the second cam via a second elastic member.

15. The valve assembly of claim 1, wherein the protruding ridge encircles at least one through-opening of the respective one of the first stationary plate and the second stationary plate.

16. The valve assembly of claim 1, wherein the sliding gate valve includes an annular seal disposed between the first stationary plate and the assembly housing, and the first stationary plate includes a seal retaining structure that retains the seal between the first stationary plate and the assembly housing.

17. A valve assembly comprising:

an assembly housing having ports, each port configured to permit fluid communication between an environment of the assembly housing and an interior space of the assembly housing;

a cam shaft supported on the assembly housing, the cam shaft configured to rotate about a rotational axis, the cam shaft including a cam that is supported on the cam shaft and rotates in concert with the cam shaft; and a sliding gate valve that includes a first stationary plate having a first plate through-opening, the first stationary plate being disposed in the assembly housing and fixed relative to the assembly housing so as to face a first one of the ports, and a movable plate having a movable plate through-opening, the movable plate being disposed in the assembly housing in a stacked arrangement with respect to the first stationary plate, the movable plate being moveable relative to the first stationary plate within a plane that is parallel to the first stationary plate, wherein the rotational axis is disposed in the plane, the movable plate is configured to be driven by the cam to move within the plane, and at least one sliding surface of the sliding gate valve includes a protruding ridge having a terminal end that is spaced apart from the at least one sliding surface and abuts a facing surface of the sliding gate valve, the at least one sliding surface of the sliding gate valve includes portions that do not form the protruding ridge and are spaced apart from the facing surface of the sliding gate valve, the protruding ridge reducing the sliding friction the sliding friction between the movable plate and the first stationary plate.

18. The valve assembly of claim 17, comprising:

a second stationary plate having a second plate through-opening, the second stationary plate being parallel to the first stationary plate, disposed in the assembly housing and fixed relative to the assembly housing so as to face a second one of the ports and such that the second plate through opening is aligned with the first plate through opening.

19. The valve assembly of claim 17, wherein the protruding ridge encircles at least one through-opening of the first stationary plate.

20. The valve assembly of claim 17, wherein the sliding gate valve includes an annular seal disposed between the first stationary plate and the assembly housing, and the first stationary plate includes a seal retaining structure that retains the seal between the first stationary plate and the assembly housing.

* * * * *